US012455849B2

(12) United States Patent
Khamesra et al.

(10) Patent No.: US 12,455,849 B2
(45) Date of Patent: Oct. 28, 2025

(54) UNIVERSAL SERIAL BUS VOLTAGE DISCHARGE

(71) Applicant: Cypress Semiconductor Corporation, San Jose, CA (US)

(72) Inventors: Arun Khamesra, Bangalore (IN); Hariom Rai, Bangalore (IN); Pulkit Shah, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 244 days.

(21) Appl. No.: 18/339,989

(22) Filed: Jun. 22, 2023

(65) Prior Publication Data
US 2024/0427722 A1  Dec. 26, 2024

(51) Int. Cl.
*G06F 13/40* (2006.01)
*G06F 1/26* (2006.01)

(52) U.S. Cl.
CPC .......... *G06F 13/4077* (2013.01); *G06F 1/266* (2013.01); *G06F 2213/0042* (2013.01)

(58) Field of Classification Search
CPC ................. G06F 13/4077; G06F 1/266; G06F 2213/0042; H02H 9/04; H02H 9/046; H02H 9/047; H02M 1/32; H02M 1/322
See application file for complete search history.

(56) References Cited

U.S. PATENT DOCUMENTS

| 10,804,890 B2 * | 10/2020 | Gong ................. H03K 17/0424 |
| 2017/0288558 A1 * | 10/2017 | Perchlik ............ H02M 3/33592 |
| 2023/0051380 A1 * | 2/2023 | Itakura .................. H02J 7/0063 |

OTHER PUBLICATIONS

"EZ-PD™ CCG5: USB Type-C Port Controller", Cypress Semiconductor Corporation, Mar. 28, 2019, 44 pages.
"TPS65994AE Dual Port USB Type-C® and USB PD Controller with Integrated Source Power Switches", Texas Instruments Incorporated, 64 pages, Jun. 2021.

* cited by examiner

*Primary Examiner* — Daniel D Chang

(57) ABSTRACT

Techniques are provided for discharge of a universal serial bus voltage. A determination is made that the universal serial bus voltage has exceeded a threshold. Accordingly, initiation of a discharge operation is triggered to discharge the universal serial bus voltage. The discharge operation includes applying incrementally increasing voltage reference values according to a periodic interval to an amplifier until a discharge trigger point is reached. The amplifier outputs a voltage signal to a gate driver that controls a gate of a transistor that provides a discharge path for the universal serial bus voltage to discharge. In response to reaching the discharge trigger point, the incremental increasing of the voltage reference values applied to the amplifier is stopped.

18 Claims, 6 Drawing Sheets

UNIVERSAL SERIAL BUS VOLTAGE DISCHARGE

TECHNICAL FIELD

The present disclosure relates to integrated circuits (ICs) that control Universal Serial Bus (USB) power delivery to electronic devices.

BACKGROUND

According to a Universal Serial Bus (USB) power delivery (USB-PD) protocol, a power source application is to meet certain timing specifications with respect to universal serial bus voltage (VBUS) movement. For example, the VBUS is to go from a maximum voltage of about 21.5 volts (V) (or 28V for extended power range (EPR)) to a minimum voltage of about 3.3V during a programmable power supply (PPS) transition within about 275 milliseconds (ms). Thus, a voltage converter has to discharge a VBUS output capacitor in order to not exceed a certain VBUS, as a USB sink voltage requirement is reduced. For a VBUS capacitor of 1 millifarads (mF), a discharge of 24.5V in 275 ms corresponds to an average current of approximately 90 milliamps (mA). A 90 mA average current, however, would result in peak power dissipation of 2.5 watts (W) at 28V.

In general, an on-the-die VBUS discharge is resistive-type and takes a higher current at a higher VBUS voltage, resulting in even higher power dissipation. For higher thermal resistive packages such as Small Outline Integrated Circuit (SOIC), Thin Shrink Small Outline Package (TS-SOP), which may be used instead of Quad Flat No-lead (QFN) due to assembly cost, a higher thermal resistivity (or theta-Ja) of 50-90° C./W results in a sudden increase in die temperature, causing a reliability risk due to a temperature reaching higher than 150° C. such as 225° C. or more. Thus, in certain USB Type-C interfaces, external power transistors are employed and controlled by a USB controller using general purpose input/output (GPIO) signals, which increases die area and costs of the USB device in order to deal with such a high temperature increase to protect the die on which the voltage converter controller(s) are located.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a method for discharge of a universal serial bus voltage is provided. The method includes determining that the universal serial bus voltage exceeds a threshold. In response to determining that the universal serial bus voltage exceeds the threshold, initiation of a discharge operation to discharge the universal serial bus voltage is triggered by a Universal Serial Bus Power Delivery (USB-PD) controller. The USB-PD controller performs the discharge operation by applying incrementally increasing voltage reference values according to a periodic interval to an amplifier until a discharge trigger point is reached. The amplifier outputs a voltage signal to a gate driver that controls a gate of a transistor to provide a discharge path for the universal serial bus voltage to discharge. In response to reaching the discharge trigger point, the incremental increasing of the voltage reference values applied to the amplifier is stopped.

In an embodiment of the techniques presented herein, an apparatus is provided. The apparatus includes means for in response to determining that a universal serial bus voltage exceeds a threshold, triggering initiation of a discharge operation to discharge the universal serial bus voltage. The apparatus includes means for performing the discharge operation by applying incrementally increasing voltage reference values according to a periodic interval to an amplifier until a discharge trigger point is reached, wherein the amplifier outputs a voltage signal to a gate driver that controls a gate of a transistor to provide a discharge path for the universal serial bus voltage to discharge. The apparatus includes mean for in response to reaching the discharge trigger point, stopping the incremental increasing of the voltage reference values applied to the amplifier.

In an embodiment of the techniques presented herein, an apparatus is provided. The apparatus includes a transistor configuration configured to provide a discharge path for a universal serial bus voltage based upon a voltage applied to a gate of a transistor. The apparatus includes a Universal Serial Bus Power Delivery (USB-PD) controller instantiated as an integrated circuit configured to provide universal serial bus power delivery control. The USB-PD controller comprises a gate driver configured to control the voltage applied to the gate of the transistor to control the transistor configuration to provide the discharge path for the universal serial bus voltage to discharge. The integrated circuit comprises an amplifier configured to output a voltage signal to the gate driver to control the gate driver. The voltage signal is applied to the amplifier based upon incrementally increasing voltage values. The incrementally increasing voltage values are increased according to a periodic interval until a discharge trigger point is detected.

In an embodiment of the techniques presented herein, an apparatus is provided. The apparatus includes a transistor configuration configured to provide a discharge path for a universal serial bus voltage based upon a voltage applied to a gate of a transistor. The apparatus includes Universal Serial Bus Power Delivery (USB-PD) controller instantiated as an integrated circuit configured to provide universal serial bus power delivery control. The USB-PD controller comprises a gate driver configured to control the voltage applied to the gate of the transistor to control the transistor configuration to provide the discharge path for the universal serial bus voltage to discharge. The apparatus includes an amplifier configured to output a voltage signal to the gate driver to control the gate driver, wherein the voltage signal is applied to the amplifier based upon incrementally increasing voltage values, wherein the incrementally increasing voltage values are increased according to a periodic interval until a discharge trigger point is detected. The apparatus includes a pull down device configured to pull down the voltage applied to the gate of the transistor to close the discharge path in response to a drain voltage of the transistor crossing the universal serial bus voltage.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
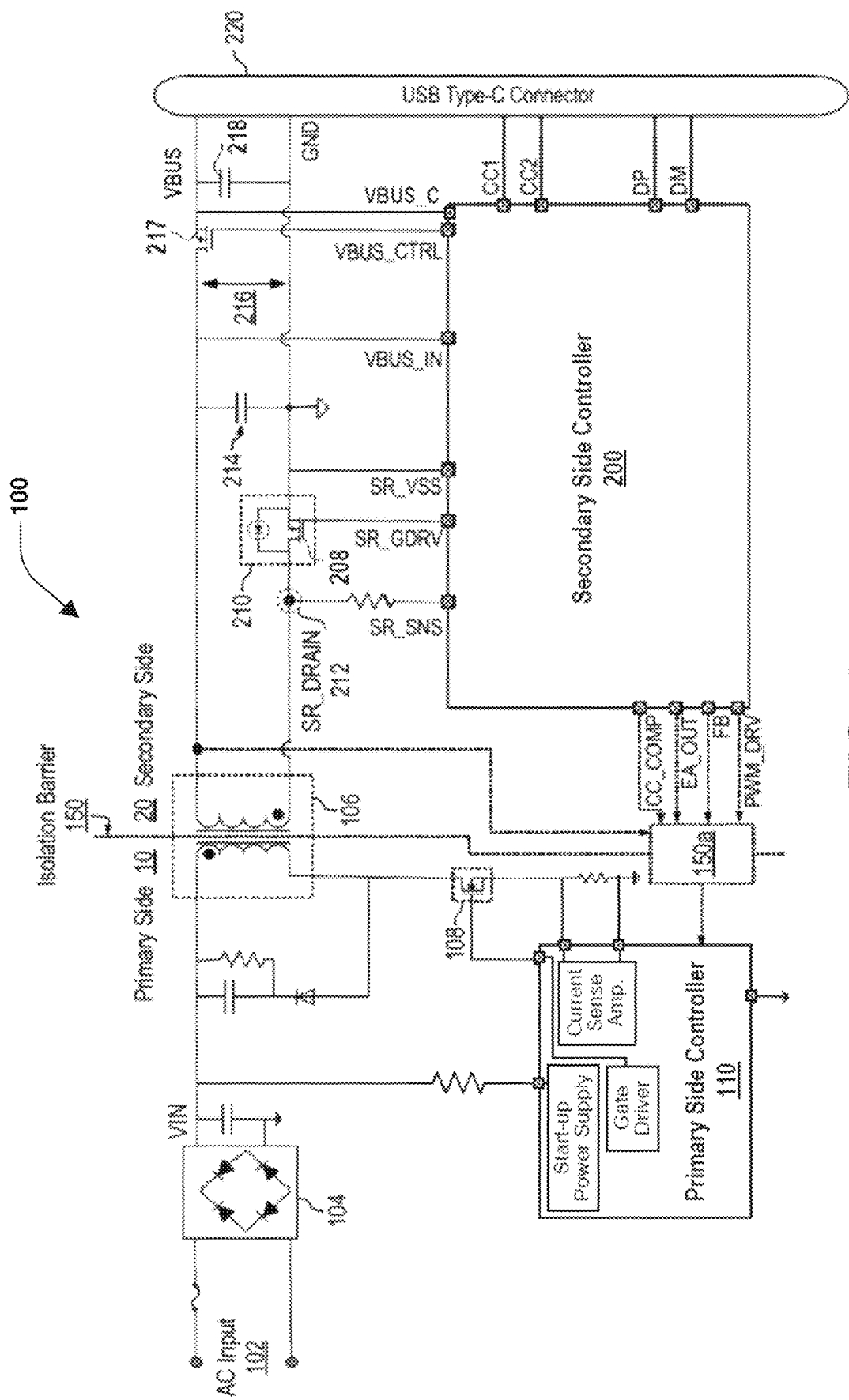
FIG. 1 is a component block diagram illustrating a device for which discharge of a universal serial bus voltage is implemented in accordance with at least some of the techniques presented herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Systems and methods are provided for discharge of a universal serial bus voltage, which may implemented for USB-PD controllers that can be disposed to operate in various electronic devices. Embodiments of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., cables, hubs, docking stations, adapters, chargers, etc.), audio/video/data recording and/or playback devices (e.g., cameras, voice recorders, hand-held scanners, monitors, etc.), and other similar electronic devices that can use USB interfaces for communication, battery charging, and/or power delivery.

USB Type-C™ (also referred to herein as "USB-C") is one type of technology for USB connectors. USB Type-C is defined in various releases and/or versions of the USB Type-C specification. The USB Type-C specification defines Type-C receptacles, Type-C plugs, and Type-C cables that can support USB communication as well as power delivery over USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. Some electronic devices may be compliant with a specific revision and/or version of the USB-PD specification (e.g., such as Revision 1.0, Revision 2.0, Revision 3.0, etc., or later revisions/versions thereof). The USB-PD specification defines a standard protocol designed to enable the maximum functionality of USB-enabled devices by providing more flexible power delivery along with data communications over a single USB-C cable through USB Type-C™ ports. The USB-PD specification also describes the architecture, protocols, power supply behavior, parameters, and cabling necessary for managing power delivery over USB-C cables at up to 100 W of power (or even higher in case of EPR). According to the USB-PD specification, devices with USB Type-C™ ports (e.g., USB-enabled devices) may negotiate for more current and/or higher or lower voltages over a USB-C cable than are allowed in older USB specifications (e.g., the USB 2.0 Specification, USB 3.1 Specification, the USB Battery Charging Specification Rev. 1.1/1.2, etc.). For example, the USB-PD specification defines the requirements for a PD contract that can be negotiated between a pair of USB-enabled devices. The PD contract can specify both the power level and the direction of power transfer that both devices can accommodate and can be dynamically re-negotiated (e.g., without device un-plugging) upon request by either device and/or in response to various events and conditions, such as power role swap, data role swap, hard reset, failure of the power source, etc. According to the USB-PD specification, an electronic device is typically configured to deliver power to another device through a power path configured on a USB VBUS line.

In some embodiments, a discharge operation is implemented in order to discharge a universal serial bus voltage (e.g., VBUS) for an integrated circuit used for USB power delivery, which may be included an USB-PD AC-DC converter. The discharge operation may be implemented for a primary side controlled or secondary side controlled USB-PD converters. In some embodiments, the discharge operation is implemented as an analog discharge operation. The discharge operation is performed to solve thermal issues related to discharging the VBUS voltage. Discharge is performed when the VBUS voltage exceeds a threshold (e.g., larger than a PD contract negotiated between a power-consumer device such as a phone and a power-delivery device such as USB-PD converter connected to a wall plug), which may be detected by firmware. Accordingly, initiation of the discharge operation is triggered.

As part of implementing the discharge operation, a transistor configuration (e.g., a synchronous rectifier field effect transistor circuit (SR_FET); a single transistor; a transistor with a diode in parallel; a transistor with a snubber circuit in parallel where the snubber circuit can have a series capacitor and resistor, etc.) is controlled to provide a discharge path (e.g., a leakage path) for the VBUS voltage to discharge. The transistor configuration is not turned completely on because this would result in a large current flow that would cause a significant amount of uncontrolled energy. Instead, the transistor configuration is turned on in an analog manner in order to limit current and perform the discharge in a controlled manner. This is achieved by applying incrementally increasing voltage reference values (e.g., increments of 10 mV or any other tunable value) according to periodical intervals (e.g., increments every 0.5 ms or any other tunable value) to an amplifier until a discharge trigger point is reached. The incrementally increasing voltage reference values cause the amplifier to output a voltage signal (e.g., a voltage signal that is 4 times a voltage reference value applied to the amplifier such as a 40 mV voltage signal for a 10 mV voltage reference value). The voltage signal causes a gate driver to control a gate of a transistor of the transistor configuration for providing the discharge path for the VBUS voltage until the trigger point is reached (e.g., a trigger point where the VBUS voltage is decreasing by 100 mV for a 0.5 ms periodic interval, or any other tunable trigger point). Once the VBUS voltage reaches a target discharged voltage, then discharge operation is stopped.

In some embodiments of performing the discharge operation, a 1 mF VBUS voltage cap corresponds to 200 mA current flowing through the transistor configuration. Accordingly, the VBUS voltage can discharge by 25V in 125 ms, which satisfies any USB specifications, such as a USB Type-C and/or the USB-PD specification, without causing undesirable thermal heat within the integrated circuit. This is because the transistor configuration and discharge path is located outside of the integrated circuit. For a primary side controlled USB-PD AC-DC converter, the discharge operation can react to situations where a primary side turns on a primary transistor configuration that will cause a drain voltage to increase. Because the current in the transistor configuration is limited to 200 mA, a pull down device is provided for disabling the voltage signal to the transistor configuration in order to stop the discharge so that the transistor configuration is not damaged from the current exceeding the 200 mA.

Compared to prior discharge schemes, the disclosed discharge operation saves physical space because the discharge operation utilizes existing components and does not require multiple external components (e.g., an external resistor and FET). The discharge operation does not consume an additional GPIO pin and GPIO pin control, thus freeing the GPIO for other functions. The discharge operation provides flexibility where the discharge rate can be controlled and programmed by varying the step increments of the voltage reference values (e.g., 10 mV step increments or any other tunable step increment) and the time increments of the periodic interval (e.g., a 0.5 ms periodic interval or any other tunable periodic interval) based upon the external VBUS voltage cap (VBUS Cap). Additionally, the discharge operation can be used for primary side controlled or secondary side controlled USB-PD AC-DC converts. The discharge operation is implemented in a reliable manner because the transistor configuration (e.g., SR_FET) is external to the integrated circuit so there is no on-die heating from the discharge of the VBUS voltage. The discharge operation is implemented at a lower die cost because no internal bulky resistors or FETs are required and existing power and ground busses do not need to be upgraded to support discharge currents.

FIG. 1 illustrates a secondary-controlled USB-PD AC-DC converter 100 for which the disclosed discharge operation can be implemented. It may be appreciated that the secondary-controlled AC-DC converter 100 is merely one type of device for which the discharge operation can be implemented, and that the discharge operation can be implemented for other devices such as a primary-controlled AC-DC converters. The AC-DC converter 100 is a flyback AC-DC converter that provides galvanic isolation between the AC input 102 and the DC output 216. The AC-DC converter 100 includes a primary side 10 disposed on the AC input side of a flyback transformer 106, and a secondary side 20 disposed on the DC output side of the flyback transformer 106. An isolation barrier 150, with isolation element 150a, electrically isolates the primary side 10 from the secondary side 20.

In at least some embodiments, the primary side 10 of AC-DC converter 100 includes an AC input 102, a bridge rectifier 104, the flyback transformer 106, a primary power switch (PS) field-effect transistor (FET) 108, and a primary side controller 110. Further, the secondary side 20 includes a secondary side controller 200, a synchronous rectifier (SR) circuit 210 (e.g., an "SR"), a drain node (SR_DRAIN) 212, an output capacitor 214, and a Universal Serial Bus (USB) Type-C connector 220.

In some embodiments, on the primary side 10, the AC input 102 is configured to receive alternating current from a power source, such as a wall socket (not shown). The bridge rectifier 104 is coupled between an AC input 102 and the flyback transformer 106 to rectify the input voltage received at the AC input 102. The flyback transformer 106 is coupled to conduct the AC current from the bridge rectifier 104, through a primary coil and the primary PS-FET 108, to ground. An input capacitor can be coupled to the output of the bridge rectifier 104 to be charged to an input voltage (Vin) into the primary side 10 of the AC-DC converter 100. In some embodiments, the primary side controller 110 is coupled to the gate of the primary PS-FET 108 to control the on and off cycles of flyback transformer 106.

In some embodiments, on the secondary side 20, the SR circuit 210 is coupled between the secondary coil of flyback transformer 106 and the output capacitor 214. The SR circuit 210 (also referred to herein as the "SR") includes a secondary PS-FET 208 (e.g., SR transistor) coupled in parallel to a diode, such that when the secondary PS-FET 208 is turned on, induction current flows to drain node 212. The SR circuit 210 is configured to charge the output capacitor 214, so that the output capacitor 214 can provide a steady voltage to the DC output 216. The DC output 216 is coupled to the power connector 220. In some embodiments, the secondary side controller 200 is coupled to the drain node 212 of the SR circuit 210 to sense the voltage (and changes thereof) on the drain node. The secondary side controller 200 is also coupled to the gate of the secondary PS-FET 208 in the SR circuit 210 to turn the SR circuit 210 on and off.

In some embodiments, a feature that determines the efficiency of an AC-DC converter (e.g., such as the AC-DC converter 100) is the operation of the secondary PS-FET switch (e.g., the secondary PS-FET 208) that controls the operation of the SR circuit 210. In primary-controlled mode, the secondary side controller 200 is dependent on the voltage level of the drain node (e.g., SR_DRAIN 212) of the SR circuit 210, as there is no other communication channel from the primary side 10 to the secondary side 20. In some embodiments, the voltage on the SR_DRAIN node goes below 0V to indicate to the secondary side controller 200 to turn on the secondary PS-FET 208. When the voltage on the SR_DRAIN node reaches back to 0V, the secondary side controller 200 detects this zero-voltage crossing and turns off the secondary PS-FET 208.

With primary-side-controlled AC-DC converters, false negative sense (NSN) detection can be a problem for the secondary side controller 200 operating in the context of a primary-controlled AC-DC converter. Such false NSN detection happens during resonant ringing when the AC-DC converter 100 is operating in Discontinuous Conduction Mode (DCM). During such resonant ringing, the voltage on the SR_DRAIN node of the SR circuit 210 can get below <0V. This voltage can be wrongly interpreted by the secondary side controller 200 as a valid NSN detection event, causing the secondary side controller 200 to turn on the secondary PS-FET 208 of the SR circuit 210. This, in turn, results in efficiency loss due to the unnecessary turning on of the SR circuit 210, thereby discharging an output load capacitor 218, which carries the VBUS voltage (e.g., VBUS_IN) to ground. In addition, if the primary side controller 110 turns on the primary PS-FET 108 at the same time, then cross-conduction will result with both the primary side 10 and the secondary side 20 being on at the same time. Such cross-conduction, however, can result in very high secondary-side current, which can cause breakdown of the diode and transistor components of the SR circuit 210. This problem can be resolved by a secondary-side-controlled AC-DC converter such as the AC-DC converter 100. The secondary side controller 200 generally ensures that the PS-FET 108 is turned off when the PS-FET 208 is turned on, and vice-versa, to prevent cross-conduction and to promote efficient operation. This may be performed by a pull down device, which is further discussed in relation to FIGS. 3A and 3B.

In some embodiments, the secondary side 20 further includes an additional or secondary switch (SS) 217, such as an NFET, coupled between a third terminal of the flyback transformer 106 and a positive DC output to enable to the secondary side controller 200 to turn off the DC output 216 to protect against over voltage and/or under voltage conditions and/or over current conditions and/or short circuit conditions. In some embodiments, such over voltage condition may trigger a skip mode, in which the secondary side controller 200 prevents power from being released from the AC-DC converter 100, such as out of the VBUS. The SS 217 includes a drain node coupled to a voltage bus in pin ($V_{BUS\_IN}$) of the secondary side controller 200; a gate node coupled to a voltage bus control pin ($V_{BUS\_CTRL}$) to drive or control the SS 217. The SS 217 includes a source node coupled to a voltage bus out pin ($V_{BUS\_C}$) and to the positive terminal of the DC output. Via the voltage bus out pin ($V_{BUS\_C}$), the secondary side controller 200 can monitor the VBUS voltage input (Vsink) that is being drawn by a sink device coupled to the USB Type-C connector 220. As will be further discussed in relation to FIGS. 2-4, a discharge operation can be performed to discharge a VBUS voltage of the AC-DC converter 100.

Figure 2:
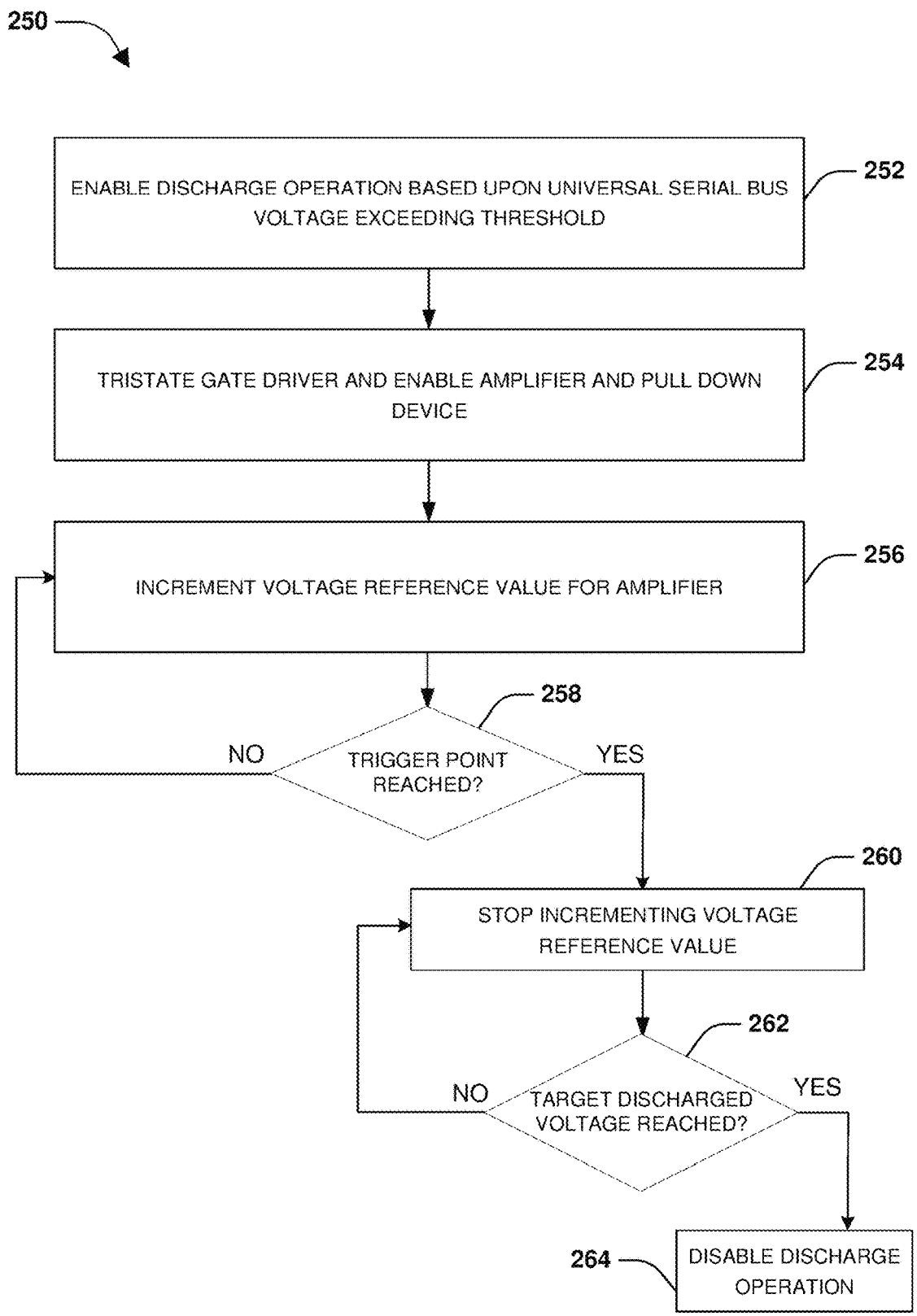
FIG. 2 is an illustration of an example method for discharge of a universal serial bus voltage in accordance with at least some of the techniques presented herein.
Figure 3A:
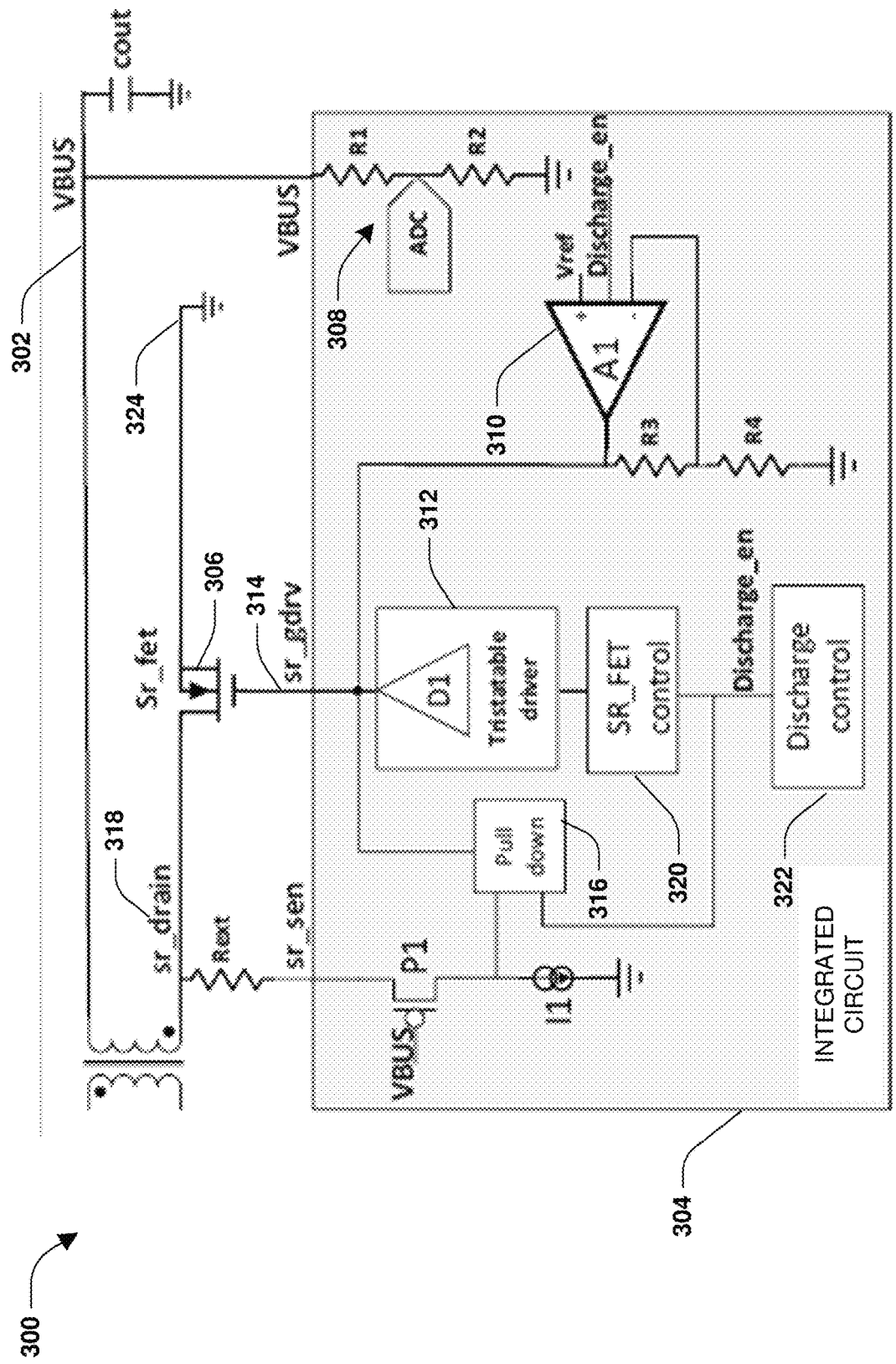
FIG. 3A is a component block diagram illustrating a device for which discharge of a universal serial bus voltage is implemented in accordance with at least some of the techniques presented herein.
Figure 3B:
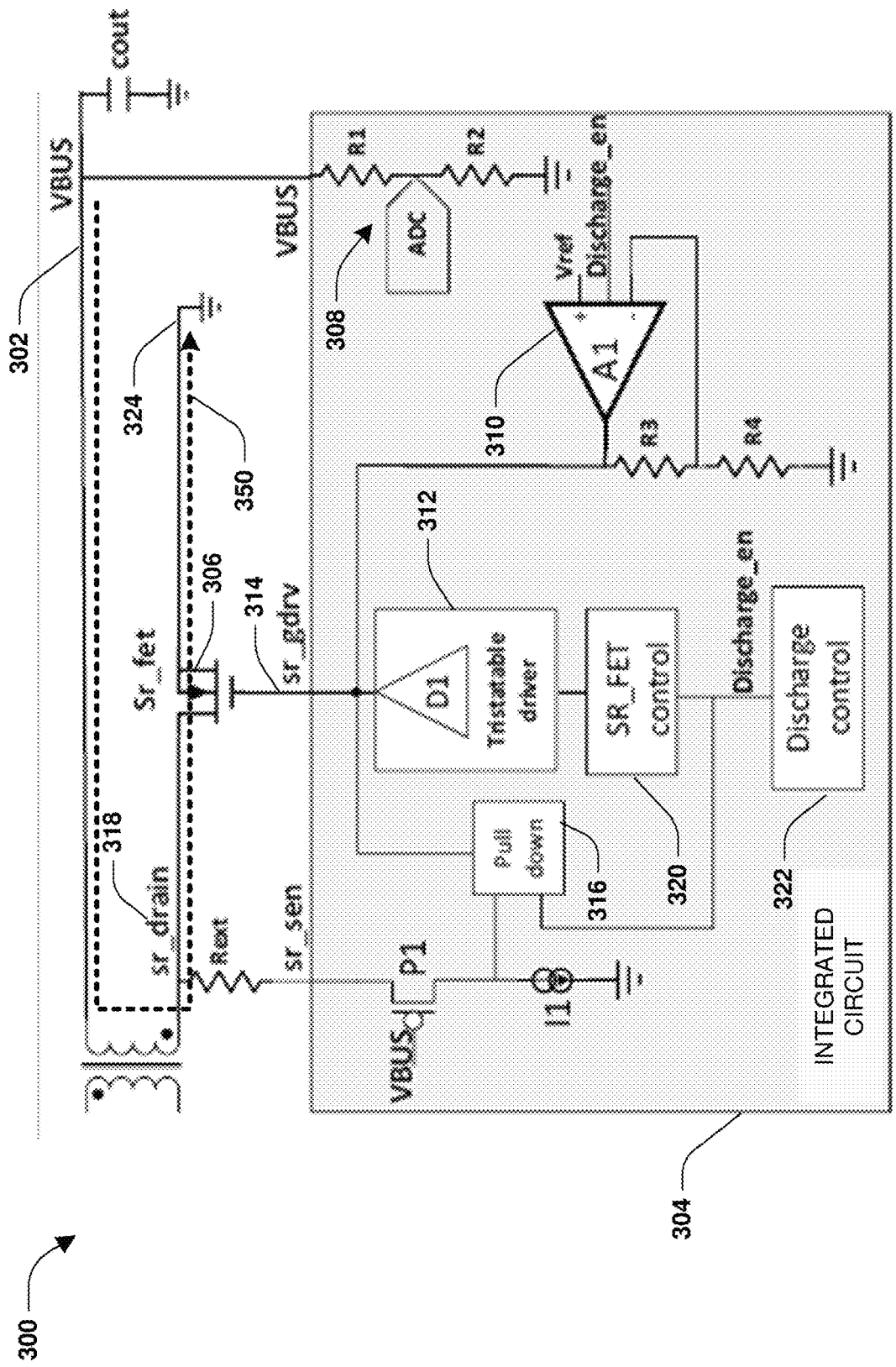
FIG. 3B is a component block diagram illustrating a device for which discharge of a universal serial bus voltage is implemented in accordance with at least some of the techniques presented herein.

FIG. 2 is an illustration of an example method 250 for discharge of a VBUS voltage, which is discussed in conjunction with system 300 of FIGS. 3A and 3B. The system 300 includes an integrated circuit 304. The integrated circuit 304 includes an amplifier (A1) 310 (e.g., an operational amplifier with a resistor R3 and R4). The amplifier (A1) 310 is enabled by a discharge_en signal. The amplifier (A1) 310 takes a voltage reference value (Vref) as an input, and outputs a voltage signal to a gate driver (D1) 312. The voltage signal may be a multiple of the voltage reference value (e.g., 4× gain in voltage such as a 40 mV voltage signal for a 10 mV voltage reference value).

The voltage signal causes the gate driver (D1) 312 to apply a gate voltage (sr_gdrv) 314 to a gate of a transistor (SR_FET) 306 of a transistor configuration in order to provide a discharge path 350 to ground 324 for a universal serial bus voltage (VBUS) 302, as illustrated by FIG. 3B. In some embodiments, the transistor configuration includes at least one of a synchronous rectifier field effect transistor circuit (SR_FET); a single transistor; a transistor with a diode in parallel; a transistor with a snubber circuit in parallel where the snubber circuit can have a series capacitor and resistor, etc.

The integrated circuit 304 may include a discharge control component 322 that generates the discharge_en signal and/or performs other functions such as detecting whether a pull down device 316 is enabled. The integrated circuit 304 may include a control component (SR_FET control) 320 used to control the transistor (SR_FET) 306 through the gate driver (D1) 312. The gate driver (D1) 312 may be tristatable where the gate driver (D1) 312 can turn the transistor (SR_FET) 306 on or off, and can also have a floating state during the discharge operation. With the floating state, a voltage less than a turn on voltage of the transistor (SR_FET) 306 can be applied to a gate of the transistor (SR_FET) 306 in order to create the discharge path (a leakage path) through the transistor configuration for discharging the VBUS voltage (VBUS) 302 to ground 324. The integrated circuit 304 also includes an ADC component 308 that is configured to measure the universal serial bus voltage (VBUS) 302.

The integrated circuit 304 (e.g., a USB-PD controller) may be configured to provide universal serial bus power delivery (USB PD) control for a power delivery connection between a primary device (e.g., power provider) and a secondary device (e.g., a power consumer). A discharge operation, such as an analog discharge operation, may be implemented for the universal serial bus voltage (VBUS) 302 associated with the USB-PD controller. The discharge operation may be implemented for a primary side controlled USB-PD AC-DC converter or a secondary side controlled USB-PD AC-DC converter.

The ADC component 308 (e.g., an analog-to-digital converter controlled by firmware of the integrated circuit 304) measures the universal serial bus voltage (VBUS) 302. The universal serial bus voltage (VBUS) 302 is compared to a threshold to determine whether the universal serial bus voltage (VBUS) 302 exceeds the threshold. In some embodiments, the threshold may be defined by a PD contract that is negotiated between a power provider (e.g., a USB-PD AC-DC converter) and a power consumer (e.g., a USB-enabled phone or laptop). A value of the negotiated current or voltage under the PD contract can change over time (e.g., the phone may initially request a higher current or voltage until the phone reaches a certain battery charge level and then may request a lower current or voltage), and thus the threshold can dynamically change over time. Dynamic changes in the threshold are taken into account when determining whether the universal serial bus voltage (VBUS) 302 exceeds a threshold corresponding to a latest value of the contract.

Referring back to FIG. 2, in some embodiments method 250 is performed by a USB-PD controller and/or components thereof (e.g., such as the components depicted in FIGS. 3A-3B). During operation 252 of method 250, initiation of the discharge operation is triggered to discharge the universal serial bus voltage (VBUS) 302 based upon the universal serial bus voltage (VBUS) 302 exceeding the threshold. As part of the initiating the discharge operation, the gate driver (D1) 312 is tristated, and the amplifier (A1) 310 and the pull down device 316 are enabled, during operation 254 of method 250. In some embodiments, the amplifier (A1) 310 is enabled based upon the discharge control component 322 transmitting the discharge_en signal to the amplifier 310. As part of the discharge operation, incrementally increasing voltage reference values are applied to the amplifier (A1) 310 at periodic intervals (e.g., initially 10 mV, 20 mV after 0.5 ms, 30 mV after another 0.5 ms, etc.) until a discharge trigger point is reached, during operation 256 of method 250. The discharge trigger point corresponds to an amount of the universal serial bus voltage (VBUS) decreasing over the periodic interval (e.g., a 100 mV decrease over a 0.5 ms interval). The amplifier (A1) 310 outputs a voltage signal to the output 314 of the gate driver (D1) 312 that controls a gate of the transistor (SR_FET) 306 to create the discharge path 350 for the universal serial bus voltage (VBUS) 302 to ground 324, as illustrated by FIG. 3B.

During the discharge operation, the ADC component 308 is measuring the universal serial bus voltage (VBUS) to determine whether the trigger point has been reached, during operation 258 of method 250. If the trigger point has not been reached, then the voltage reference values are continually incremented according to the period interval. If the trigger point has been reached, then the voltage reference value is no longer incremented and remains at a current value, during operation 260 of method 250. After the trigger point has been reached and the universal serial bus voltage (VBUS) is discharging through the discharge path 350, the ADC component 308 is measuring the universal serial bus voltage (VBUS) to determine if a target discharge voltage has been reached, during operation 262 of method 250. If the target discharge voltage has not been reached, then the discharge path is maintained.

If the target discharge voltage has been reached, then the discharge operation is disabled, during operation 264 of method 250. The discharge operation is disabled by disabling the amplifier (A1) 310 (e.g., the discharge control component) 322 stops transmitting the discharge_en signal to the amplifier (A1) 310). Additionally, the gate driver (D1) 312 is enabled to start controlling the gate of the transistor (SR_FET) 306 in the manner to disable the created discharge path 350. The gate driver (D1) 312 turns off the transistor (SR_FET) 306 by reducing or pulling down a voltage applied to the gate of the transistor (SR_FET) 306 so that the transistor (SR_FET) 306 no longer provides the discharge path 350. Furthermore, the pull down device 316 is disabled once the target discharge voltage has been reached.

Before the target discharge voltage has been reached and before the pull down device 316 is disabled, the pull down device 316 can be used to pull down the gate voltage (sr_gdrv) 314 of the gate of the transistor (SR_FET) 306 in order to close the discharge path 350. The pull down device 316 is triggered to pull down the gate voltage (sr_gdrv) 314 based upon a drain voltage (sr_drain) 318 crossing the universal serial bus voltage (VBUS) 302, which can occur if a primary-side FET is turned on while the transistor (SR_FET) 306 is being controlled to create the discharge path 350.

Figure 4:
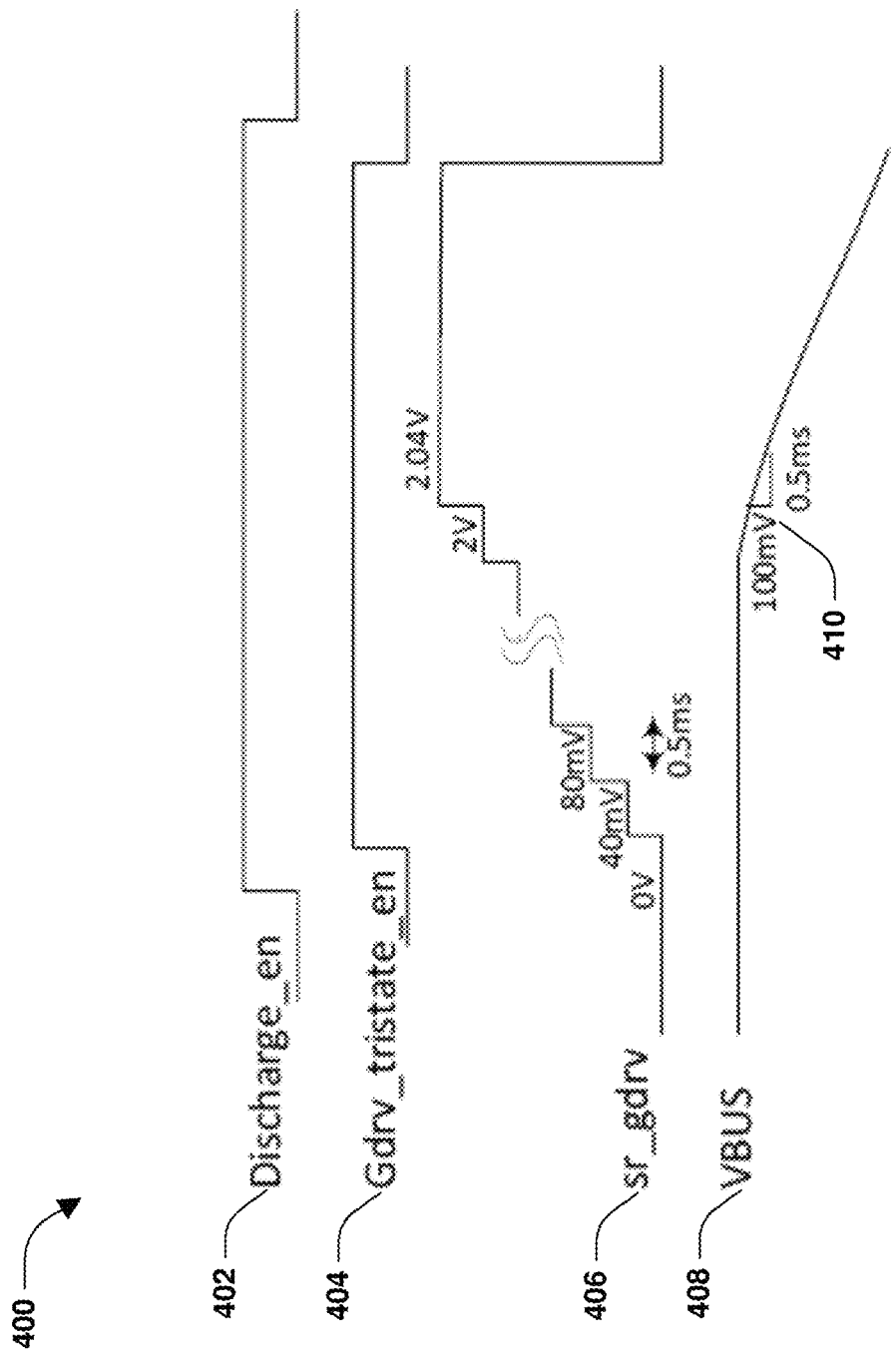
FIG. 4 is an illustration of an example timing diagram, according to some embodiments.

FIG. 4 is an illustration of an example timing diagram 400. The timing diagram 400 illustrates values of a universal serial bus voltage (VBUS) 408, a gate voltage (sr_gdrv) 406 of a transistor configuration (e.g., SR_FET) that provides a discharge path for the universal serial bus voltage (VBUS) 408, a discharge enable signal (discharge_en) 402 used to enable an amplifier to initiate a discharge operation, and a gate driver tristate enable signal (gdrv_tristate_en) 404 used to tristate a gate driver to allow control to be given to the amplifier to control a gate of a transistor (SR_FET) of the transistor configuration. When the universal serial bus voltage (VBUS) 408 exceeds a threshold, the discharge enable signal (discharge_en) 402 goes high. This signals the amplifier to output a voltage signal based upon incrementally increasing voltage reference values input into the amplifier. Additionally, the gate driver is tristated based upon the gate driver tristate enable signal (gdrv_tristate_en) 404 going high.

The gate voltage (sr_gdrv) 406 of the transistor is incrementally increasing by 40 mV increments every periodic interval of 0.5 ms based upon the voltage signal output by the amplifier to the gate driver. When the universal serial bus voltage (VBUS) 408 reaches a trigger point 410 (e.g., 100 mV decrease over a 0.5 ms periodic interval), the amplifier stops incrementally increasing the voltage signal, and the voltage signal remains at a current value such as about 2.04V or any other value. Once the universal serial bus voltage (VBUS) 408 reaches a target discharge voltage, the gate driver tristate enable signal 404 goes low to pull the gate of the transistor down. This causes the gate voltage (sr_gdrv) 406 to go low. Once the discharge operation completes, the discharge enable signal (discharge_en) 402 goes low.

Figure 5:
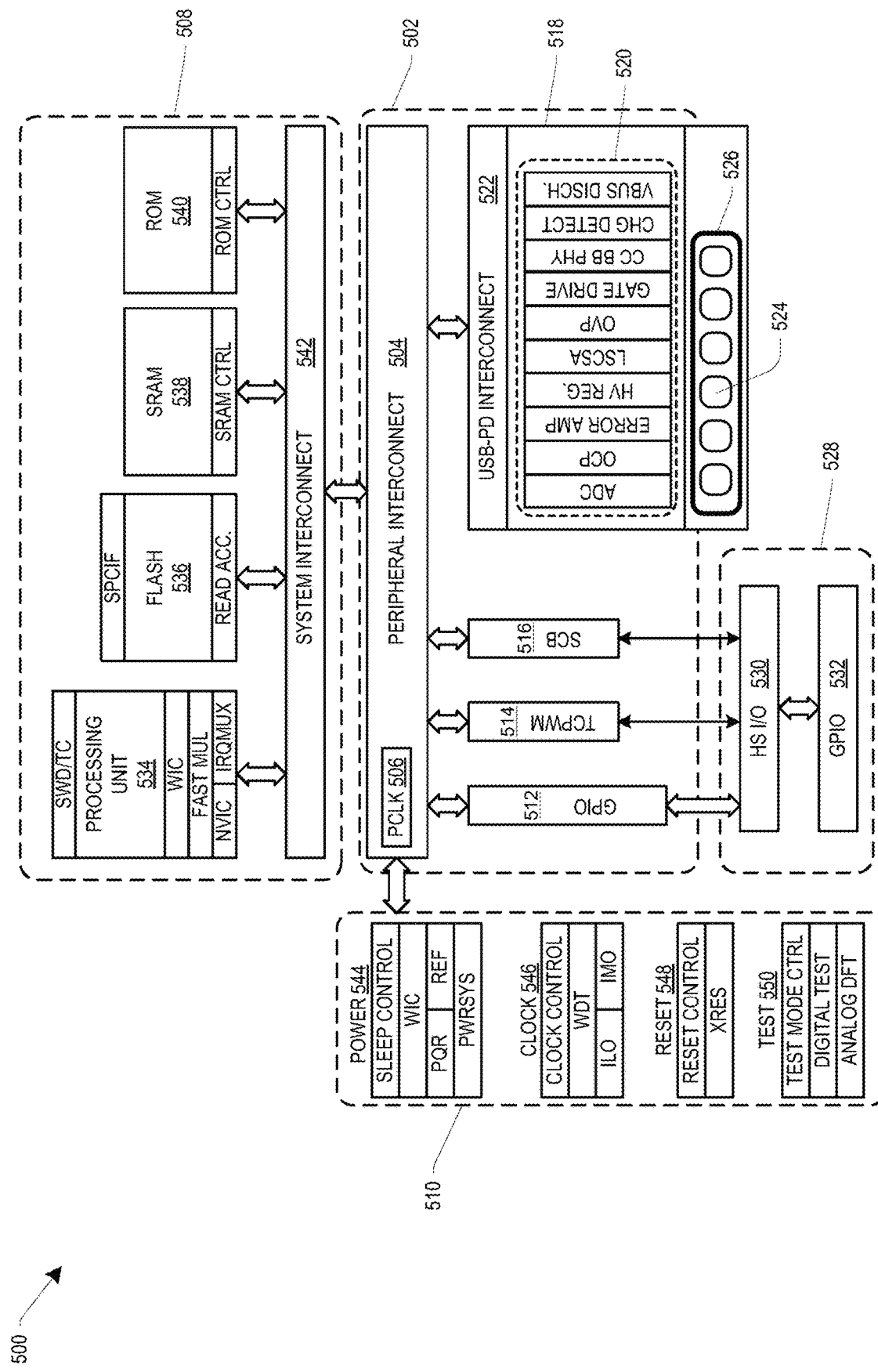
FIG. 5 illustrates an exemplary embodiment of a system for a USB device, in accordance with some embodiments.

FIG. 5 is a block diagram illustrating a system 500 for a USB device, in accordance with some embodiments. The system 500 may include a peripheral subsystem 502 that includes a number of components for use in the USB power delivery (USB-PD). The peripheral subsystem 502 may include a peripheral interconnect 504 including a peripheral clock module (PCLK) 506 for providing clock signals to the various components of the peripheral subsystem 502. The peripheral interconnect 504 may be a peripheral bus, such as a single level or Multi-level Advanced High Performance Bus (AHB), and can provide a data and control interface between the peripheral subsystem 502, a CPU subsystem 508, and system resources 510. The peripheral interconnect 504 may include controller circuitry, such as direct memory access (DMA) controllers, which may be programmed to transfer data between peripheral blocks without input from the CPU subsystem 508, without control of the CPU subsystem 508, or without stressing the same transfer.

The peripheral interconnect 504 may be used to couple the peripheral subsystem 502 components to other components of the system 500. A number of general purpose inputs/outputs (GPIOs) 512 may be coupled to the peripheral interconnect 504 for sending and receiving signals. The GPIOs 512 may include circuitry configured to implement various functions such as pull-up, pull-down, input threshold selection, input and output buffer enable/disable, single multiplexing, and so on. Other functions can also be implemented by the GPIOs 512. One or more timer/counter/pulse width modulators (TCPWM) 514 may also be coupled to the peripheral interconnect and may include circuitry to implement timing circuits (timers), counters, pulse width modulators (PWMs), decoders, and other digital functions associated with I/O signals work and can provide digital signals for system components of the system 500. The peripheral subsystem 502 may also include one or more Serial Communication Blocks (SCBs) 516 for implementing serial communication interfaces such as I2C, Serial Peripheral Interface (SPI), Universal Asynchronous Receiver/Transmitter (UART), Controller Area Network (CAN), CXPI (Clock Extension Peripheral Interface), etc.

For USB power delivery applications, the peripheral subsystem 502 may include a USB power delivery subsystem 518 coupled to the peripheral interconnect 504 and including a set of USB PD modules 520 for use with the USB power delivery. The USB PD modules 520 may be coupled to the peripheral interconnect 504 by a USB-PD interconnect 522. The USB PD modules 520 may include: an analog-to-digital converter (ADC) module for converting various analog signals into digital signals; an error amplifier (AMP) that regulates the output voltage on the VBUS line by PD contract; a high voltage (HV) regulator for converting the power source voltage to a precise voltage (such as 3.5-5V) to power the system 500; a low-side current sense amplifier (LSCSA) to accurately measure load current, an over-voltage protection (OVP) module and an over-current protection (OCP) module to provide over-current and over-voltage protection on the VBUS line with configurable thresholds and response times; one or more gate drivers for external power field effect transistor (FETs) used in USB power delivery in provider and consumer configurations; and a communications channel PHY (CC-BB-PHY) module to support communications on a Type-C communications channel (CC) line. The USB PD modules 520 may also include a charger detection module to determine if charging circuitry is present and coupled to the system 500 and a VBUS discharge module to control the discharge of voltage on the VBUS. The VBUS discharge module may be configured to couple to a power source node on the VBUS line or to an output (power sink) node on the VBUS line and adjust the voltage on the VBUS line to the desired voltage level (i.e., the voltage level specified in the PD-Contract negotiated voltage level). The USB power delivery subsystem 518 may also include pads 524 for external connections and Electrostatic Discharge (ESD) suppression circuitry 526 that may be required on a Type-C port. The USB PD modules 520 may also include a communication module for retrieving and transmitting information, such as control signals, such as from the secondary-side controller 104 to the primary-side controller 102.

The GPIOs 512, the TCPWM 514, and the SCB 516 may be coupled to an input/output (I/O) subsystem 528, which may include a high-speed (HS) I/O matrix 530 connected to a number of GPIOs 532. The GPIOs 512, the TCPWM 514, and the SCB 516 may be coupled to the GPIOs 532 through the HS-I/O matrix 530.

The central processing unit (CPU) subsystem 508 is provided for processing instructions, storing program information and data. The CPU subsystem 508 may include one or more processing units 534 for executing instructions and reading from and writing to memory locations from a number of memories. The processing unit 534 may be a processor suitable for operation in an integrated circuit (IC) or system-on-chip (SOC) device. In some embodiments, the processing unit 534 may be optimized for low power operation with extensive clock gating. In this embodiment, different internal control circuits can be implemented for processing unit operation in different power states. For example, the processing unit 534 may include a single wire debug (SWD) module, a terminal count (TC) module, a wake-up interrupt controller (WIC) configured to wake up the processing unit from a sleep state, which may shut down power when the IC or SOC is in is in a sleep state, a fast multiplier, a nested vector interrupt controller (NVIC), and an interrupt multiplexer (IRQMUX). The CPU subsystem 508 may include one or more memories, including a flash memory 536, a static random access memory (SRAM) 538, and a read only memory (ROM) 540. The flash memory 536 may be non-volatile memory (NAND flash, NOR flash, etc.) configured to store data, programs, and/or other firmware instructions. The flash memory 536 may include system performance controller interface (SPCIF) registers and a read accelerator and, by being integrated into the CPU subsystem 508, improve access times. The SRAM 538 may be volatile memory configured to store data and firmware instructions accessible by the processing unit 534. The ROM 540 may be configured to store boot routines, configuration parameters, and other firmware parameters and settings that do not change during operation of the system 500. The SRAM 538 and the ROM 540 may have associated control circuitry. The processing unit 534 and the memory modules 536, 538, 540 may be coupled to a system interconnect 542 to route signals to and from the various components of the CPU subsystem 508 to other blocks or modules of the system 500. The system interconnect 542 can be implemented as a system bus, such as a single-level or multi-level AHB. The system interconnect 542 may be configured as an interface to couple the various components of the CPU subsystem 508 together. The system interconnect 542 may be coupled to the peripheral interconnect 504 to provide signal paths between the CPU subsystem 508 and components of the peripheral subsystem 502.

The system resources 510 may include a power module 544, a clock module 546, a reset module 548, and a test module 550. The power module 544 may include a sleep control module, a wake-up interrupt control (WIC) module, a power-on-reset (POR) module, a number of voltage references (REF), and a PWRSYS module. In some embodiments, the power module 544 may include circuitry that allows the system 500 to draw power from and/or provide power to external sources at different voltage and/or current levels and control operation in different power states, such as active, low power, or sleep. In various embodiments, more power states may be implemented as the system 500 throttles operation to achieve a desired power consumption or power output. For example, the secondary-side controller 104 can access secondary electrical parameters on the secondary side. The clock module 546 may include a clock control module, a watchdog timer (WDT), an internal low-speed oscillator (ILO), and an internal main oscillator (IMO). The reset module 548 may include a reset control module and an external reset module (XRES module). The test module 550 may include a module to control and enter a test mode, as well as test control modules for analog and digital functions (digital test and analog DFT).

The system 500 may be implemented in a monolithic (e.g., single) semiconductor die. In other embodiments, different parts or modules of the system 500 may be implemented on different semiconductor dies. For example, the memory modules 536, 538, 540 of the CPU subsystem 508 may be on-chip or off-chip. In still other embodiments, circuitry with separate dies can be packaged in a single "chip" or remain separate and arranged on a circuit board (or in a USB cable connector) as separate elements.

The system 500 can be implemented in a number of application contexts to provide USB PD functionality. In any application context, an electronic device (e.g., a USB-enabled device) may have an IC controller or SOC implementation embodied by the system 500 arranged and configured to perform operations according to the techniques described herein. In one embodiment, the system 500 may be arranged and configured in a personal computer (PC) power adapter for a laptop, notebook computer, and so on. In another embodiment, the system 500 may be housed in a power adapter (e.g., a wall charger) for a mobile electronic device (e.g. a smartphone, a tablet, etc.). In another embodiment, the system 500 may be placed and configured in a wall outlet configured to provide power via USB Type-A and/or Type-C port(s). In another embodiment, the system 500 may be arranged and configured in a car charger configured to provide power via USB Type-A and/or Type-C port(s). In yet another embodiment, the system 500 may be arranged and configured in a power bank that can be charged via a USB Type-A and/or Type-C port and then provide power to another electronic device. In other embodiments, a system such as the system 500, may be configured with the power switch gate control circuitry described herein and may be incorporated into various other USB-enabled electronic or electromechanical devices.

It should be understood that a system, such as the system 500, implemented on or as an IC controller, can be placed in various applications that vary in terms of the type of power source used and the direction in which power is supplied. For example, in the case of a car charger, the power source is a car battery that provides DC power, while in the case of a mobile power adapter, the power source is an AC wall outlet. Further, in the case of a PC power adapter, the flow of power input is from a provider device to a consumer device, while in the case of a power bank, the flow of power input can be in either direction, depending on whether the power bank is operating as a power provider (e.g., to power another device) or as a power consumer (e.g., to allow itself to be charged). For these reasons, the various applications of the system 500 should be considered in an illustrative rather than a limiting sense.

An embodiment of the presently disclosed techniques includes a method for discharge of a universal serial bus voltage. The method includes in response to determining that the universal serial bus voltage exceeds a threshold, a Universal Serial Bus Power Delivery (USB-PD) controller triggering initiation of a discharge operation to discharge the universal serial bus voltage; and the USB-PD controller performing the discharge operation by: applying incrementally increasing voltage reference values according to a periodic interval to an amplifier until a discharge trigger point is reached, wherein the amplifier outputs a voltage signal to a gate driver that controls a gate of a transistor to provide a discharge path for the universal serial bus voltage to discharge; and in response to reaching the discharge trigger point, stopping the incremental increasing of the voltage reference values applied to the amplifier.

According to some embodiments, the method includes in response to the universal serial bus voltage reaching a target discharged voltage, the USB-PD controller disabling the discharge operation by disabling the amplifier.

According to some embodiments, the threshold is defined by a contract negotiated between a USB-PD power converter and a peripheral device coupled thereto.

According to some embodiments, the method includes detecting a change in value of the threshold from a first value to a second value; and determining whether to subsequently trigger the discharge operation based upon whether a current value of the universal serial bus voltage exceeds the second value.

According to some embodiments, the discharge trigger point corresponds to an amount of the universal serial bus voltage decreasing over the periodic interval.

According to some embodiments, the method includes in response to the universal serial bus voltage reaching a target discharged voltage, controlling the gate driver to reduce a voltage applied to the gate of the transistor.

According to some embodiments, the method includes programming, as tunable parameters, the periodic interval, an amount the voltage reference values are incremented, and an amount the voltage signal is incremented based upon the voltage reference values.

According to some embodiments, performing the discharge operation includes enabling a pull down device, and the method includes: in response to the universal serial bus voltage reaching a target discharged voltage, disabling the pull down device.

According to some embodiments, wherein the method is performed by the USB-PD controller for a power converter in accordance with a USB-PD specification.

According to some embodiments, the method includes in response to a drain voltage of the transistor crossing the universal serial bus voltage, controlling a pull down device to pull down a gate voltage of the gate of the transistor to close the discharge path for the universal serial bus voltage.

An embodiment of the presently disclosed techniques includes an apparatus. The apparatus includes a transistor configuration configured to provide a discharge path for a universal serial bus voltage based upon a voltage applied to a gate of a transistor; and a Universal Serial Bus Power Delivery (USB-PD) controller instantiated as an integrated circuit configured to provide universal serial bus power delivery control, wherein the USB-PD controller comprises: a gate driver configured to control the voltage applied to the gate of the transistor to control the transistor to provide the discharge path for the universal serial bus voltage to discharge; and an amplifier configured to output a voltage signal to the gate driver to control the gate driver, wherein the voltage signal is based upon incrementally increasing voltage values applied to the amplifier, wherein the incrementally increasing voltage values are increased according to a periodic interval until a discharge trigger point is detected.

According to some embodiments, the discharge trigger point corresponds to an amount of the universal serial bus voltage decreasing over the periodic interval.

According to some embodiments, the amplifier and the gate driver are disabled from discharging the universal serial bus voltage based upon the universal serial bus voltage reaching a target discharge voltage.

According to some embodiments, the apparatus comprises a pull down device configured to pull down the voltage applied to the gate of the transistor to close the discharge path in response to a drain voltage of the transistor crossing the universal serial bus voltage.

According to some embodiments, wherein the apparatus is a primary-side controlled USB-PD power converter, and wherein the discharge path is established as part of an analog discharge operation controlled by a secondary-side controller of the USB-PD power converter.

According to some embodiments, wherein the apparatus is a secondary-side controlled USB-PD power converter, and wherein the discharge path is established as part of an analog discharge operation controlled by a secondary-side controller of the USB-PD power converter.

An embodiment of the presently disclosed techniques includes an apparatus. The apparatus includes a transistor configuration configured to provide a discharge path for a universal serial bus voltage based upon a voltage applied to a gate of a transistor; and a Universal Serial Bus Power Delivery (USB-PD) controller instantiated as an integrated circuit configured to provide universal serial bus power delivery control, wherein the USB-PD controller comprises: a gate driver configured to control the voltage applied to the gate of the transistor to control the transistor configuration to provide the discharge path for the universal serial bus voltage to discharge; an amplifier configured to output a voltage signal to the gate driver to control the gate driver, wherein the voltage signal is based upon incrementally increasing voltage values applied to the amplifier, wherein the incrementally increasing voltage values are increased according to a periodic interval until a discharge trigger point is detected; and a pull down device configured to pull down the voltage applied to the gate of the transistor to close the discharge path in response to a drain voltage of the transistor crossing the universal serial bus voltage.

According to some embodiments, the amplifier and the gate driver are disabled from discharging the universal serial bus voltage based upon the universal serial bus voltage reaching a target discharge voltage.

According to some embodiments, the pull down device is disabled based upon the universal serial bus voltage reaching a target discharge voltage.

According to some embodiments, wherein the apparatus is one of a primary-side controlled USB-PD power converter or a secondary-side controlled USB-PD power converter.

Various operations of embodiments are provided herein. In one embodiment, one or more of the operations described may constitute computer readable instructions stored on one or more computer readable media, which if executed by a computing device such as a microcontroller or another type of integrated circuit (IC) controller, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" and/or the like is used herein to mean serving as an example, instance, illustration, etc., and not necessarily as advantageous. As used herein, "or" is intended to mean an inclusive "or" rather than an exclusive "or". In addition, "a" and "an" as used in this application can generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for discharge of a universal serial bus voltage, comprising:
   in response to determining that the universal serial bus voltage exceeds a threshold, a Universal Serial Bus Power Delivery (USB-PD) controller triggering initiation of a discharge operation to discharge the universal serial bus voltage; and
   the USB-PD controller performing the discharge operation by:
      applying incrementally increasing voltage reference values according to a periodic interval to an amplifier until a discharge trigger point is reached, wherein the amplifier outputs a voltage signal to a gate driver that controls a gate of a transistor to provide a discharge path for the universal serial bus voltage to discharge;
      in response to reaching the discharge trigger point, stopping the incremental increasing of the voltage reference values applied to the amplifier; and
      in response to the universal serial bus voltage reaching a target discharged voltage, disabling the discharge operation by disabling the amplifier.

2. The method of claim 1, wherein the threshold is defined by a contract negotiated between a USB-PD power converter and a peripheral device coupled thereto.

3. The method of claim 1, comprising:
   detecting a change in value of the threshold from a first value to a second value; and
   determining whether to subsequently trigger the discharge operation based upon whether a current value of the universal serial bus voltage exceeds the second value.

4. The method of claim 1, wherein the discharge trigger point corresponds to an amount of the universal serial bus voltage decreasing over the periodic interval.

5. The method of claim 1, comprising:
   in response to the universal serial bus voltage reaching the target discharged voltage, controlling the gate driver to reduce a voltage applied to the gate of the transistor.

6. The method of claim 1, comprising:
   programming, as tunable parameters, the periodic interval, an amount the voltage reference values are incremented, and an amount the voltage signal is incremented based upon the voltage reference values.

7. The method of claim 1, wherein performing the discharge operation includes enabling a pull down device, and wherein the method comprises:
   in response to the universal serial bus voltage reaching the target discharged voltage, disabling the pull down device.

8. The method of claim 1, wherein the method is performed by the USB-PD controller for a power converter in accordance with a USB-PD specification.

9. The method of claim 1, comprising:
   in response to a drain voltage of the transistor crossing the universal serial bus voltage, controlling a pull down device to pull down a gate voltage of the gate of the transistor to close the discharge path for the universal serial bus voltage.

10. An apparatus, comprising:
    a transistor configuration configured to provide a discharge path for a universal serial bus voltage based upon a voltage applied to a gate of a transistor of the transistor configuration; and
    a Universal Serial Bus Power Delivery (USB-PD) controller instantiated as an integrated circuit configured to provide universal serial bus power delivery control, wherein the USB-PD controller comprises:

a gate driver configured to control the voltage applied to the gate of the transistor to control the transistor configuration to provide the discharge path for the universal serial bus voltage to discharge; and an amplifier configured to output a voltage signal to the gate driver to control the gate driver, wherein the voltage signal is based upon incrementally increasing voltage values applied to the amplifier, wherein the incrementally increasing voltage values are increased according to a periodic interval until a discharge trigger point is detected;

wherein the amplifier and the gate driver are disabled from discharging the universal serial bus voltage based upon the universal serial bus voltage reaching a target discharge voltage.

11. The apparatus of claim 10, wherein the discharge trigger point corresponds to an amount of the universal serial bus voltage decreasing over the periodic interval.

12. The apparatus of claim 10, comprising:
a pull down device configured to pull down the voltage applied to the gate of the transistor to close the discharge path in response to a drain voltage of the transistor crossing the universal serial bus voltage.

13. The apparatus of claim 10, wherein the apparatus is a primary-side controlled USB-PD power converter, and wherein the discharge path is established as part of an analog discharge operation controlled by a secondary-side controller of the USB-PD power converter.

14. The apparatus of claim 10, wherein the apparatus is a secondary-side controlled USB-PD power converter, and wherein the discharge path is established as part of an analog discharge operation controlled by a secondary-side controller of the USB-PD power converter.

15. An apparatus, comprising:
a transistor configuration configured to provide a discharge path for a universal serial bus voltage based upon a voltage applied to a gate of a transistor of the transistor configuration; and
a Universal Serial Bus Power Delivery (USB-PD) controller instantiated as an integrated circuit configured to provide universal serial bus power delivery control, wherein the USB-PD controller comprises:
a gate driver configured to control the voltage applied to the gate of the transistor to control the transistor configuration to provide the discharge path for the universal serial bus voltage to discharge;
an amplifier configured to output a voltage signal to the gate driver to control the gate driver, wherein the voltage signal is based upon incrementally increasing voltage values applied to the amplifier, wherein the incrementally increasing voltage values are increased according to a periodic interval until a discharge trigger point is detected; and
a pull down device configured to pull down the voltage applied to the gate of the transistor to close the discharge path in response to a drain voltage of the transistor crossing the universal serial bus voltage.

16. The apparatus of claim 15, wherein the amplifier and the gate driver are disabled from discharging the universal serial bus voltage based upon the universal serial bus voltage reaching a target discharge voltage.

17. The apparatus of claim 15, wherein the pull down device is disabled based upon the universal serial bus voltage reaching a target discharge voltage.

18. The apparatus of claim 15, wherein the apparatus is one of a primary-side controlled USB-PD power converter or a secondary-side controlled USB-PD power converter.

* * * * *